3,658,938
POLYAMIDE-IMIDE/POLYSULFONE
COMPOSITES
George T. Kwiatkowski, Piscataway; George L. Brode, Somerville, and Lloyd M. Robeson, Lebanon, N.J., assignors to Union Carbide Corporation, New York, N.Y.
No Drawing. Filed Dec. 30, 1970, Ser. No. 102,922
Int. Cl. C08g 41/04
U.S. Cl. 260—857 PI
9 Claims

ABSTRACT OF THE DISCLOSURE

The mechanical blending of polysulfones with oligomer sulfone ether diamine polyamide/imides affords polyblends having environmental stress aging characteristics greater than those of the polysulfones and improved processability over that of the oligomer sulfone ether diamine polyamide/imides.

BACKGROUND OF THE INVENTION

This invention pertains to blends of polyamide/imides with polysulfones and more particularly to polyamide/imides synthesized by the condensation of aromatic diamines with trimellitic acid anhydride or trimellitic anhydride acid chloride or trimellitic acid.

Polyamide/imides made by the condensation polymerization of aromatic diamines with trimellitic acid anhydride were found to have excellent high temperature resistance properties as well as other excellent physical and chemical properties. Such high temperature resistant polyamide/imides which are normally solid have repeating units represented by the formula:

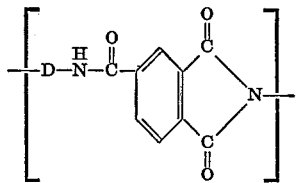

wherein D is a residue remaining after removal of both amine groups from at least one diamine having the formula:

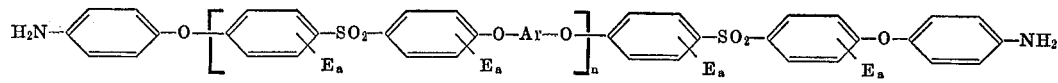

wherein Ar is a diradical selected from the group consisting of

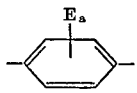

and

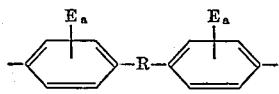

each E is a halogen substituent, each $a$ is an integer having values of 0 to 4, R is an alkylidene radical having 1 to 10 carbon atoms, and $n$ is a rational number having average values of about 0.5 to about 25.

Despite the excellent chemical and physical properties of the polyamide/imides described above there are occasions when it becomes desirous to modify these polyamide/imides to improve processability where shaped articles and the like are to be fabricated by injection molding techniques. However, the achievement of improved processability must not be effected with the loss of other desirable properties. This requirement immediately rules out monomeric materials such as ordinary plasticizers and limits the choice to other polymeric materials. This course of action, unfortunately, is difficult to achieve because of the insolubility and incompatibility of the above-described polyamide/imides with many useful high polymers. The choice is further restricted by the fact that most of the known high polymers extant are not heat-resistant in the region where polyamide/imides function well. One of the classes of the few heat-resistant high polymers available today are the polysulfones, but these are not soluble in the polyamide/imides of this invention. The polysulfones of this invention are normally solid polymers having a basic structure composed of recurring units having the formula:

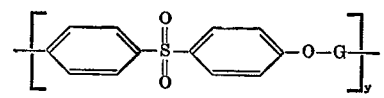

wherein G is a divalent radical selected from the group consisting of —E—O— and

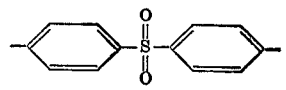

E is the radical residuum of a dihydric polynuclear phenol remaining after the removal of both OH groups having the structure:

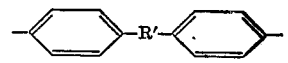

$y$ is an integer denoting the degree of polymerization and has a value sufficiently large so as to afford a normally solid polymer and R' is either a divalent hydrocarbon radical containing from 1 to about 10 carbon atoms or, —SO$_2$— wherein the ratio of polyamide-imide to polysulfone is in the range of about 99:1 to about 1:99. Preferred ranges are about 95:5 to about 75:25 and about 90:10 to about 80:20.

The divalent hydrocarbon radical R' can be aliphatic, alicyclic or aromatic. Specific examples of dihydric polynuclear phenols which can be used to provide the E component above include:

2,2-bis(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(p-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)-propane,
2,2-bis-(3-isopropyl-4-hydroxyphenyl)propane,
2,2-bis-(2-isopropyl-4-hydroxyphenyl)propane,
2,2-bis-(4-hydroxynaphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
bis(4-hydroxyphenyl)cyclohexylmethane,
1,2-bis-(4-hydroxyphenyl)1,2-bis-(phenyl)-propane, 2,2-bis-(4-hydroxyphenyl)-1-phenyl-propane,
1,1-bis-(4-hydroxyphenyl)cyclohexane,
4,4-dihydroxydiphenyl sulfone and the like.

is then dehydrated in situ with a chemical dehydrating agent such as acetic anhydride to the polyamide/imide as shown below:

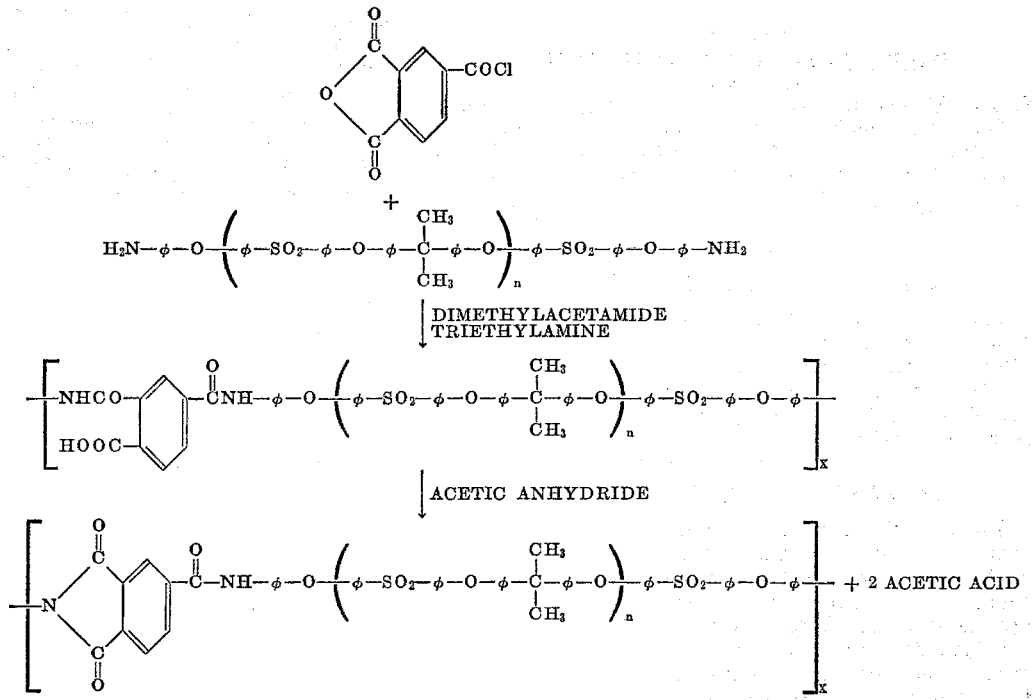

The preferred polysulfones from the standpoint of both usefulness and availability are those containing the repeating units:

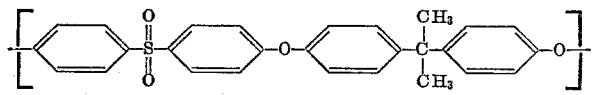

or

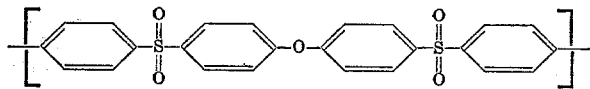

In general, the mechanical blending of two insoluble polymers, that is, polymers which retain their respective glass transition temperatures in a composite results in brittle, useless composites due to poor compatibility and, therefore, adhesion between the respective phases. Blends of insoluble polymers which afford a reasonable compromise in the mechanical properties of both resins are a rare exception.

SUMMARY OF THE INVENTION

It has been found surprisingly that although the polyamide/imides and polysulfones described above are not mutually soluble, as evidenced from a plot of modulus versus temperature, blends of these two resins nevertheless show an averaging of the mechanical properties of the individual components and afford a mixture with improved processability over that of the polyamide/imides alone. An added and completely unexpected advantage of this combination was found to be the enhanced environmental stress aging characteristics of the blend over that of polysulfone alone.

The polyamide/imides used in this invention can be prepared by first condensing a trimellitoyl halide such as trimellitic anhydride acid chloride and one of the diamines described above in a polar solvent such as dimethylactamide to form a low molecular weight polyamic acid which upon treatment with an equivalent amount of an HCl scavenger, such as, anhydrous triethylamine rapidly increases in molecular weight to that of a high polymer. This reaction is illustrated below with trimellitoyl chloride and a sulfone ether diamine. The polyamic acid wherein $n$ is a rational number having average values of about 0.5 to about 25; $x$ is a number representing the degree of polymerization and is sufficiently large to afford a normally solid high molecular weight polymer and —$\phi$— is a symbol representing

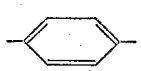

The temperature at which the diamine-trimellitic anhydride acid chloride reaction takes place to form the polyamic acid is preferably about —20 to +60° with about 0° C. to +20° being particularly preferred.

The chemical conversion of polyamic acid to polyamide-imide which can be described as an imidization or dehydration step can be carried out in the temperature range of about —10° C. to 120° C. with a range of about 20° C. to 40° C. being preferred. Thermal imidization is also possible with and without the use of an azeotropic solvent to assist in the removal of water. Thermal imidization can be accomplished in the temperature range of about 50–400° C., with a range of 100–250° C. being preferred.

Chemical dehydrating agents which can be used for the conversion of the polyamic acids to polyamide-imides include but are not limited to aliphatic acid anhydrides, such as, acetic acid anhydride, propionic acid anhydride and the like; halogenated materials such as $POCl_3$, $SOCl_2$, and the like; molecular sieves, silica gel, phosphorus pentoxide, aluminum oxide and the like.

In the preparation of the polyamide-imides, pressure is not critical although it is preferred for economic reasons to employ atmospheric pressure. If desired, however, sub-atmospheric as well as super-atmospheric pressure can be used.

In preparing the polyamide-imides of this invention from trimellitic anhydride acid chloride it is preferred to use a specific order of addition as regards to the use of the HCl scavenging reagent. If the scavenger is added prior to the addition of trimellitoyl chloride the result is a lower molecular weight polyamide-imide. If the addition of the scavenger is delayed until after the polymerization reaction is substantially complete the result is a very slow polymerization rate because the solvent such as dimethylacetamide only partially complexes the hydrogen chloride formed during the polymerization process. It has been unexpectedly found that if the scavenger is added soon after the addition of the trimellitoyl chloride one gets the best results as manifested by the production of a high molecular weight polyamide-imide with relatively fast polymerization rates.

Suitable scavenging agents for the removal of hydrogen chloride include tertiary amines containing aliphatic substituents such as trimethylamine, triethylamine, tripropylamine, tributylamine, and the like. Other reagents which can be used include cyclic organic bases, such as, pyridine, lutidine, collidine, quinoline, and the like, inorganic bases such as alkali metal hydroxides, alkali metal carbonates, alkali metal acetates, alkaline earth oxide, alkaline earth hydroxides, alkaline earth carbonates, alkali earth acetates, and the like; and organic oxides such as ethylene oxide, propylene oxide, and the like.

The polar solvents, used for the preparation of the instant polyamide-imides are those having a solubility parameter, $\beta$, of about 9.8 to 15 as defined by H. Burrell, Official Digest, pp. 725–758, October 1955. Exemplary solvents include N,N-dialkyl carboxylic acid amides where the alkyls are lower alkyls, such as, dimethyl acetamide, dimethylformamide and the like, heterocycles, such as N-methylpyrrolidone, tetrahydrothiophene-1,1-dioxide, and the like; organic sulfur oxides, such as, dimethyl sulfoxide, dimethyl sulfone, and the like; cyclic lactones such as $\gamma$-butyrolactone, and the like; and mixtures of the above enumerated solvents with liquid hydrocarbons having about 5 to 20 carbon atoms, such as, toluene, xylene, and ketone such as methylethyl ketone, cyclohexanone and the like.

Although the polyamide-imides can be recovered by stripping off the solvent system following the polymerization and imidization steps, it is preferred to employ a precipitation technique using a solvent or solvents which are miscible with the reaction mixture solvents but in which the polyamide-imides themselevs are insoluble. Suitable precipitating solvents include aliphatic ketones, such as, acetone, methyl ethyl ketone, diethyl ketone, and the like; aliphatic alcohols such as methanol, ethanol, isopropanol, and the like; aliphatic esters such as methyl acetate, ethyl acetate, butyl acetate and the like; and water, hydrocarbons such as benzene, toluene.

Thermoplastic polyamide-imide can be conveniently recovered by vacuum stripping the solution by processing through a vented extruder.

The precipitation recovery method facilitates filtration of the polyamide-imides and their purification by washing on the filter. Drying the polyamide-imides at temperatures of up to about 200° C. effects removal of residual solvents in general.

The polysulfones of this invention are commercially available materials. One class is described in Modern Plastics Encyclopedia, 1969–1970, McGraw-Hill, N.Y. page 198 and can be prepared by the condensation polymerization of 4,4'-dichlorodiphenylsulfone with the sodium salt of bisphenol A or 2,2-bis(p-hydroxyphenyl)propane. The other class can be prepared by the Friedel-Crafts polycondensation of diphenyl ether (4,4'-disulfonyl chloride) and diphenyl 4,4'-disulfonyl chloride with diphenyl ether and is described in Modern Plastics, pp. 150–157, January 1970, British 1,060,546 and U.S. 3,321,449.

The blending of the polyamide-imides with polysulfone can be effected in conventional and commercially available mixing equipment.

The invention is further described in the examples which follow. All parts and percentages are by weight unless otherwise specified.

EXAMPLE 1

An oligomer diamine was prepared by charging a five liter, three neck flask equipped with a mechanical stirrer, thermometer, condenser, Barrett tube and nitrogen inlet tube with 286.6 grams (1.257 mols) of bisphenol A, 275.0 grams (2.52 mols) of p-aminophenol, 1.7 liters of dimethylsulfoxide, 1.0 liters of toluene and 401.5 grams (5.034 mols) of a 50.21 percent aqueous solution of sodium hydroxide. The mixture was heated to reflux under nitrogen until all of the water was removed as a toluene-water azeotrope. Then, 723 grams (2.52 mols) of p-dichlorodiphenyl sulfone was added to the flask and the pot temperature maintained at 160–165° C. for one hour with stirring. At this point there was added a solution of sodium p-aminophenolate, prepared by dehydrating a mixture of 11.2 grams (0.105 mol) of p-aminophenol, 35 ml. of dimethylsulfoxide, 25 ml. of toluene and 8.0 grams of a 50.2 percent aqueous sodium hydroxide solution, was then added and the resultant mixture stirred for one hour at 140–155° C. The product oligomer diamine was recovered by pouring the reaction mixture into an excess of water containing 2% sodium hydroxide and 1% sodium sulfide with stirring, filtering, washing on the filter with water and drying. A yield of oligomer diamine of 929 grams (84.5%) was obtained having an equivalent weight of 474 (theoretical is 437) as determined by amine end group titration with a perchloric acid-acetic acid mixture (0.1 mol) which corresponds to a molecular weight of 948.

The formula of this oligomer diamine is

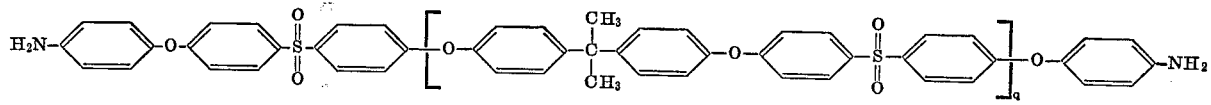

wherein $q$ has an average value of 1.2.

Preparation of oligomer sulfone ether diamine polyamide-imide

A five-liter resin kettle equipped with a mechanical stirrer, thermometer, and nitrogen inlet tube was charged with 747 grams (0.79 mol) of the oligomer sulfone ether diamine prepared above and 2500 ml. of anhydrous dimethylacetamide (DMAC). The diamine was allowed to dissolve in the solution and then cooled to 0° C. At this point 163.5 grams (0.78 mol) of trimellitoyl chloride was added at such a rate as to keep the temperature between 0° C.–10° C. After stirring for one hour at 0–10° C., 101 grams (1.0 mol) of anhydrous triethylamine was added at a rate sufficient to keep the temperature below 10° C. In twenty minutes, the solution became extremely viscous and an additional 1000 ml. of DMAC was added. After two hours, 0.5 gram of phthalic anhydride was added to end-cap the polymer. After stirring for a total of three hours after the addition of the triethylamine, 97 grams (0.95 mol) of acetic anhydride containing 5 grams of pyridine was added and the solution stirred for ten hours at room temperature.

The polyamide-imide solution was coagulated by adding the reaction mixture to water in a 1:10 ratio and the fibrous polymer which formed collected by vacuum filtration. The polymer was then slurried in acetone for 0.5 to 1.0 hour and the acetone removed by vacuum filtration. The polyamide-imide was collected in glass pans and dried in a vacuum oven at 150° C. for forty hours. The reduced viscosity of the dried powder which was obtained was 0.44 dl./g. (0.2% solution in dimethylacetamide at 25° C.). This polyamide-imide has repeating units represented by the formula:

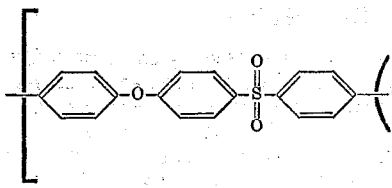

wherein n has an average value of about 1 and x, the degree of polymerization has a value sufficiently large so as to afford a normally solid polymer.

Extrusion of oligomer sulfone ether diamine polyamide-imide

A standard one inch single vent, single screw extruder was used to complete the imidization of the oligomer sulfone ether diamine polyamide-imide described in the preceding paragraph by a melt processing operation. Zone temperatures were as follows:

| | Degrees C. |
|---|---|
| (1) Feed section | 260 |
| (2) Metering section | 312 |
| (3) Vent section | 330 |
| (4) Pump out section | 320 |

The screw had an $L/D$ ratio of 24/1. The vent pressure was 0.1 mm. Hg absolute and the screw speed was 100 r.p.m.

The dried oligomer sulfone ether diamine polyamide-imide was "starve" fed to the extruder by means of a vibra-screw feeder. A product rate of 750 grams per hour was obtained under the above conditions. The extrudate was of good quality with few gels and a reduced viscosity of 0.43 deciliter per gram (dl./g.). The material processed through a vented extruder had a melt index (350° C., 1 p.) of 1.3 dg./min. without variations between cuts. The melt flow ratio $(MF_2/MF_1)$ was 1.0.

Melt index measurements were performed as described in ASTM D-1238-61.

Melt flow determinations were made by weighing in grams the amount of polyamide-imide which at a temperature of 350° C. and under a pressure of 44 p.s.i. flowed through an orifice having a diameter of 0.0825 inch and a length of 0.315 inch over a 10 minute period. This value was recorded as $MF_1$ and is the same as melt index. A second set of melt flow measurements $(MF_2)$ was made by allowing the polyamide-imide to remain at a temperature of 350° C. for 0.5 hour before running the melt flow test. The ratio of $MF_2$ divided by $MF_1$ is an indication of the thermal stability of the polymer, the ideal value being 1.0.

Reduced viscosity was determined by weighing a 0.2 gm. sample of polyamide-imide into a 100 ml. volumetric flask and adding dimethylacetamide thereto. After solution was complete, additional solvent was added to exactly the fiducial line while the flask was maintained in a 25° C. constant temperature bath. The solution was thereafter filtered through a sintered glass funnel and the viscosity of a sample determined in a viscometer tube at 25° C. Reduced viscosity values were computed by using the equation:

$$RV = \frac{t_s - t_o}{ct_o}$$

wherein:

$t_o$ is the efflux time for the solvent.
$t_s$ is the efflux time for the polyamid-imide solution.
C is the concentration of the polyamid-imide solution in terms of grams of polyamide-imide per 100 ml. of solution.

Tensile impact strengths were determined in conformity with ASTM D-256-56. Glass transition temperature $(T_g)$ also referred to as second order phase transition temperatures refer to the inflection temperature found by plotting the resilience (recovery from 1% elongation) of a film, ranging in thickness from 3 to 15 mils, against the temperature. A detailed explanation for determining resilience and inflection point is to be found in an article by A. Brown (Textile Research Journal), vol. 25, 1955 at page 891.

EXAMPLE 2

Preparation of polysulfone

A 500 ml. air-free stainless steel resin kettle equipped with a thermocouple, gas inlet tube, mechanical stirrer, and fractionating column equipped with a moisture separation trap was charged with 34.3 grams (0.15 mol) of bisphenol A, 2,2'-bis(p-hydroxyphenyl)propane, 770 grams of dimethylsulfoxide, and 210 grams of chlorobenzene. When a solution was obtained the system was deaerated and 24.0 grams of a 50 percent aqueous air-free sodium hydroxide solution was added. Two liquid phases resulted. The system was then brought rapidly to the boiling point while nitrogen was passed through the system.

At about 120° C. (pot temperature) distillation commenced with the formation of a two phase mixture of water and chlorobenzene in the moisture trap. The lower chlorobenzene phase was recycled after about 30 minutes until the pot temperature leveled off at about 135–140° C. At this point a single liquid phase was obtained together with a precipitate of the disodium salt of bisphenol A.

Distillation was continued removing chlorobenzene together with some dimethylsulfoxide and the remaining small amount of water until the pot temperature reached 155° C. A homogeneous viscous liquid system resulted. A hot 50% solution (at 110° C.) of 43.0 grams of 4,4'-dichlorodiphenyl sulfone in chlorobenzene was added at 155–160° C. over a period of about ten minutes allowing chlorobenzene to distill simultaneously. Polymerization commenced immediately upon contact and was allowed to continue for a period of about 60 minutes.

Gaseous methyl chloride was sparged through the system until a light amber color was obtained.

Work-up of the polysulfone was effected by dilution with chlorobenzene to a solids content of 12% followed by centrifugation filtration (to remove by-product sodium chloride and cyclic dimer which is insoluble at this point), and finally coagulation in four volumes of ethyl alcohol. The coagulated fluffy polysulfone, after such filtration, was reslurried in three volumes in ethyl alcohol, refiltered and dried in a vacuum oven at about 125° C. for about four hours. The yield of polysulfone was about 85 to 90%. The reduced viscosity of this product was 0.48 dl./g. (measured as a 0.2% solution in chloroform at 25° C.). The material after processing through a vented extruder had a melt index (350° C., 1 p.) of 5.5 dg./min. This normally solid polysulfone had repeating units represented by the formula:

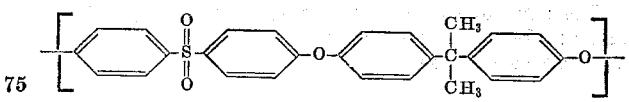

EXAMPLE 3

Mechanical blend of polyamide-imide and polysulfone

The polyamide-imide prepared in Example 1 was blended with an equal amount by weight of a polysulfone prepared as in Example 2 by extruding this mixture in a ¾ inch diameter extruder.

Although the plot of modulus against temperature for this blend show that the polysulfone and the polyamide-imide are not mutually soluble and that two separate transitions are present characteristics of each polymer, the mechanical properties of the blend are intermediate between that of the polysulfone and the polyamide-imide as shown in Table I below.

a 1–30 mil thick polymer film approximately ⅛ inch wide and 4 inches long by means of an Instron Tensile Tester. The film was wrapped with an adsorbent cloth and a solvent was applied (to the film and cloth). The time was then noted and again noted when rupture occurs or 10 minutes without rupture achieved. If rupture has not occurred, the film was examined for craze marks and tested for brittleness by the ASTM D–256–56 Pendulum Impact Strength Method.

TABLE I

| Physical measurement | Polyamide-imide | Polysulfone | 50:50 poly-amide-imide polysulfone |
|---|---|---|---|
| Tensile modulus (p.s.i.) ASTM D–638–60 | 315,000 | 270,000 | 310,000 |
| Tensile strength (p.s.i.) ASTM D–638–60 | 11,650 | 10,000 | 10,350 |
| Percent elongation ASTM D–638–60 | 8.5 | 50 | 13 |
| Pendulum impact strength (ft.-lbs./in.³), ASTM D–256–56 | 34 | 180 | 121 |
| $T_g$ (0° C.) | 220 | 180 | 220; 180 |
| Melt index ASTM D–1238–61T (350° C., 1 p.) (dg./min.) | 1.3 | 7.0 | 4.5 |

Environmental stress aging results for polysulfone alone, for polyamide-imide alone and for the 50:50 (weight) mixture of these two are shown in Table II.

TABLE II.—ENVIRONMENTAL STRESS AGING RESULTS

Polysulfone

| Solvent | Stress Pressure applied | Time to rupture |
|---|---|---|
| Acetone, p.s.i. | 200 | Immediate rupture. |
| Ethyl acetate, p.s.i. | 200 | Do. |
| Xylene, p.s.i. | 200 | Rupture after one minute. |
| Trichloroethylene, p.s.i. | 200 | Immediate rupture. |

Polyamide-imide

| Solvent | Stress Pressure applied | Time to rupture |
|---|---|---|
| Acetone, p.s.i. | 1,000 | Rupture after 10 seconds. |
| Ethyl acetate, p.s.i. | 1,000 | 10 minutes NCNB.* |
| Xylene, p.s.i. | 1,000 | Do. * |
| Trichloroethylene, p.s.i. | 1,000 | 10 minutes NCNB;* 2,000 psi. 1 minute rupture. |

50% polysulfone/50% polyamide-imide

| Solvent | Stress Pressure applied | Time to rupture |
|---|---|---|
| Acetone, p.s.i. | 200 | Rupture after 15 seconds. |
| Ethyl acetate, p.s.i. | 200 | 10 minutes NCNB. |
| Xylene, p.s.i. | 200 | Do. |
| Trichloroethylene, p.s.i. | 200 | 10 minutes NCNB tacky. |

*NCNB=Non-crazed, non-brittle.

Environmental stress aging determinations were made as follows:

A calculated stress pressure (in p.s.i.) was applied to

EXAMPLE 4

A polyamide-imide prepared as described in Example 1 but having a reduced viscosity of 0.6 dl./g. and a melt flow at 650° F. of less than 0.1 dg./min. was blended with a polysulfone prepared as in Example 2 having a melt flow at 650° F. and 44 p.s.i. of 5–8 dg./min. (ASTM D–1238–61T) in a weight ratio of 85/15 by processing through a single screw, single vent, one inch extruder in two runs. The melt index of the resulting blend at 650° F. and 44 p.s.i. was 0.5 dg./min. Part of the extrudate was ram injected molded using a stock temperature of 710–720° F. and a mold temperature of 250° F. This material could be remolded without any significant change in the properties. Physical properties measured on each of the polyamide-imide and polysulfone alone together with the 85/15 blend and a remolded blend are collated in Table III below:

TABLE III.—Properties of Injected Molded Polyamide-Imide/Polysulfone Composites

| Physical test | Polyamide-imide | Poly-sulfone | 85/15 poly-amide-imide/ polysul-fone | Remolded 85/15 poly-amide-imide/ polysul-fone |
|---|---|---|---|---|
| Reduced viscosity, dl./g | 0.48 | 0.48 | 0.59 | |
| Melt index 350° C., dg./min | 1.0 | 7.0 | | |
| Heat deflection temperature, ° C., ASTM 648–56 | 203 | 174 | 204 | |
| Tensile strength, p.s.i. | 10,900 | 10,200 | 11,700 | 10,200 |
| Modulus of elasticity, p.s.i. ASTM D–638–60 | 417,000 | 360,000 | 406,000 | 402,000 |
| Percent elongation | 4 | 50 | 4.5 | 3.5 |
| Notched Izod, ft. lb./in. of notch ASTM D–256–56 | 2.7 | 1.3 | 3.0 | 2.3 |

The data tabulated hereinabove in Table III clearly demonstrates the superiority in processability of the blend of polyamide-imide with polysulfone over that of the polyamide-imide alone which at an RV of 0.59 dl./g. could not be injection molded.

Data on environmental stress aging characteristics of the 85:15 polyamide-imide:polysulfone blend are contained in Table IV:

TABLE IV

| Solvent | Stress, p.s.i. | 85/15 polyamideimide/ polysulfone | Polyamideimide |
|---|---|---|---|
| Xylene | 1,000 | NCNB* | NCNB. |
| Trichloroethylene | 1,000 | Ruptured in one minute | NCNB. |
| Do | 500 | NCNB | NCNB. |
| Acetone | 200 | Ruptured immediately | Ruptured in one minute. |

*NCNB=Non-crazed, non-brittle.

The blends of this invention are useful for the fabrication of structural laminates and for the preparation of electric wire coatings, dielectric films, molded parts, and the like.

EXAMPLE 5

A polyamide-imide prepared as in Example 1 was blended with a polysulfone having the repeating units

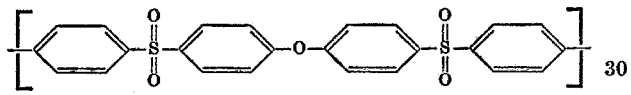

(commercially available from Minnesota Mining and Manufacturing Co. as Astrel 360) in a 50:50 weight ratio. The blending was accomplished by casting 20% solutions of each of these polymers in dimethylacetamide and then removing the solvent in an air circulating oven at 150° C. The resultant films were uniform and tough. Mechanical and physical property measurements indicated the two polymers were mechanically compatible. The stress-strain curve of the blend showed separate glass transition temperatures for polyamide-imide and polysulfone respectively demonstrating the mutual insolubility of the two components.

The performance properties of the blend prepared as described above together with the performance properties of the polyamide-imide alone and the polysulfone alone are presented in Table V.

TABLE V

| Property | Polysulfone (Astrel 360) | Polyamide-imide (Example 1) | 50/50 blend of polysulfone and polyamide-imide |
|---|---|---|---|
| $T_g$, ° C | 285 | 230 | 280, 230 |
| Tensile modulus, p.s.i. | 294,000 | 417,000 | 350,000 |
| Tensile strength, p.s.i. | 8,890 | 10,900 | 10,600 |
| Percent elongation | 5.2 | 4 | 4.3 |
| Pendulum impact, ft. lbs./in.³ | 50 | 35 | 39 |

Although the invention has been described in its preferred forms with a certain degree of particularity, it is understood that the present disclosure of the preferred forms have been made only by way of example and that numerous changes may be resorted to without departing from the spirit and scope of the invention.

What is claimed is:

1. A mechanical blend of:
   (a) a normally solid polyamide-imide having repeating units represented by the formula:

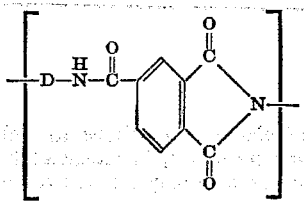

wherein D is a residue remaining after removal of both amine groups from at least one diamine having the formula:

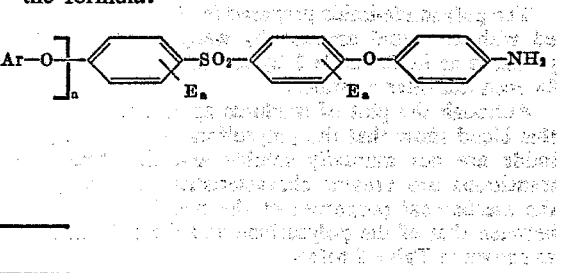

wherein Ar is a hydrocarbon diradical selected from the group consisting of:

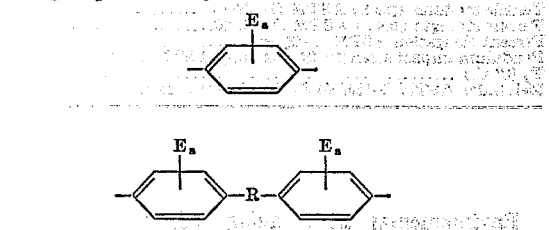

wherein R is an alkylidene moiety containing from about 1 to 10 carbon atoms, each E is a halogen substituent, each $a$ is an integer having values of 0 to 4 and $n$ is a rational number having values of about 0.5 to about 25; and (b) a normally solid polysulfone having a basic structure composed of recurring units having the formula:

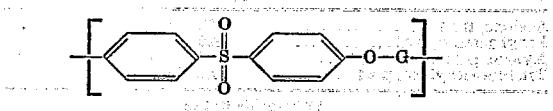

wherein G is a divalent radical selected from the class consisting of —E—O— and

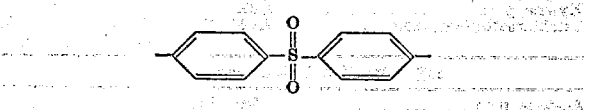

E is the radical residuum of a dihydric phenol remaining after the removal of both OH groups having the structure:

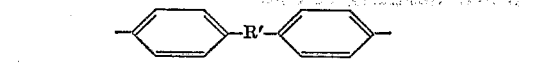

and R' is a divalent radical selected from the group consisting of hydrocarbon radicals containing from 1 to about 10 carbon atoms and —SO₂—, wherein the ratio of polyamide-imide to polysulfone is in the range of about 99 to about 1 to about 1 to about 99.

2. The blend claimed in claim 1 wherein G is —E—O— and E is the radical residuum of 2,2-bis-(4-hydroxyphenyl)propane.

3. The blend claimed in claim 1 wherein $n$ has an average value of 1.

4. The blend claimed in claim 1 wherein the ratio of polyamide-imide to polysulfone is about 95:5 to about 75:25.

5. The blend claimed in claim 1 wherein the ratio of polyamide-imide to polysulfone is about 90:10 to about 80:20.

6. The blend claimed in claim 1 wherein Ar is

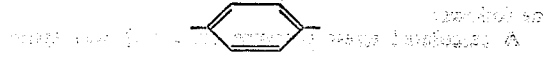

7. The blend claimed in claim 1 wherein Ar is
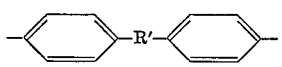
8. The blend claimed in claim 7 where R is
9. The blend claimed in claim 1 wherein G is
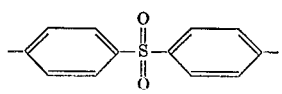
References Cited
UNITED STATES PATENTS
| | | | |
|---|---|---|---|
| 3,342,897 | 9/1967 | Abramo | 260—857 PI |
| 3,431,238 | 3/1969 | Borman | 260—857 R |
| 3,440,215 | 4/1969 | Holub | 260—857 PI |
PAUL LIEBERMAN, Primary Examiner
U.S. Cl. X.R.
260—47 R, 49, 78 TF, 857 R